June 25, 1957 — I. NESSON — 2,796,623
FLEXIBLE WIPER BLADE
Filed Feb. 16, 1955 — 2 Sheets-Sheet 1
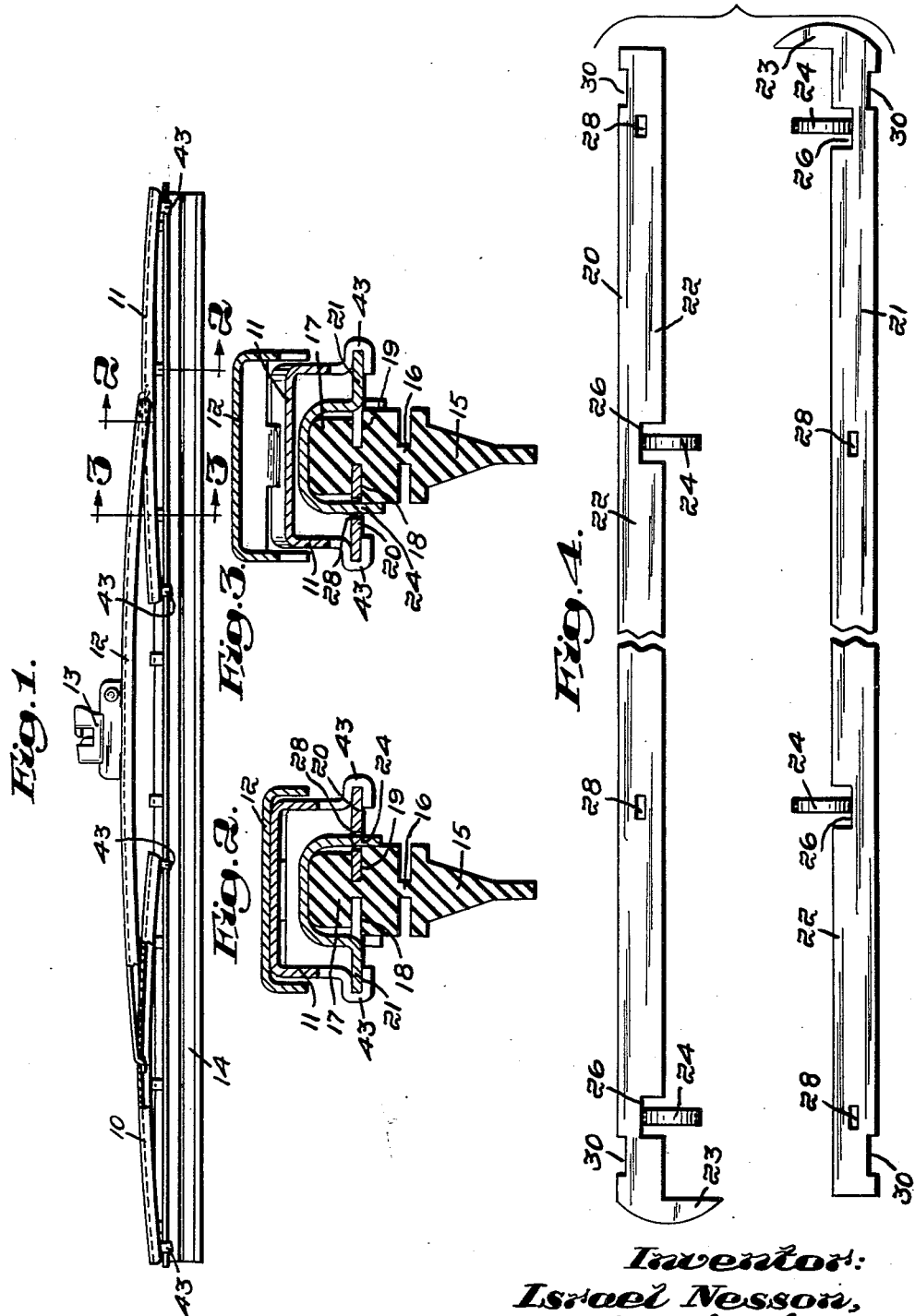
Inventor:
Israel Nesson,
by Arthur D. Thomson
Attorney June 25, 1957     I. NESSON     2,796,623
FLEXIBLE WIPER BLADE
Filed Feb. 16, 1955     2 Sheets-Sheet 2
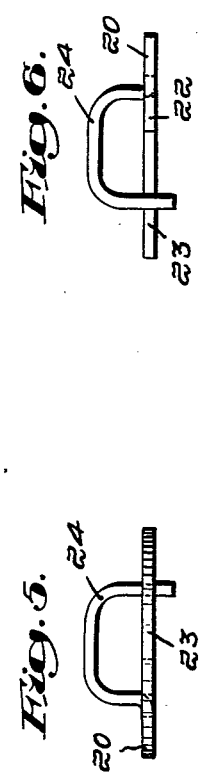
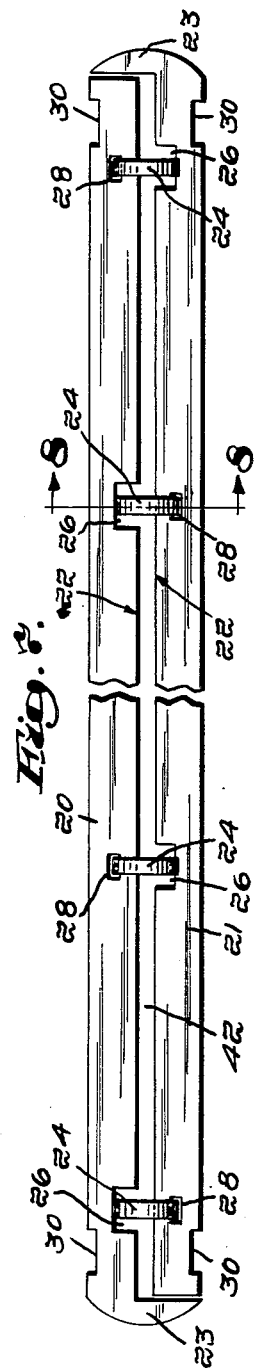
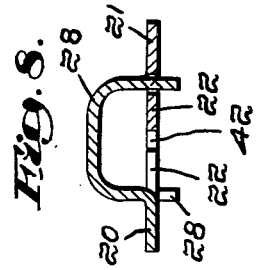
Inventor:
Israel Nesson,
by Arthur D. Thomson
Attorney United States Patent Office 2,796,623
Patented June 25, 1957

2,796,623
FLEXIBLE WIPER BLADE

Israel Nesson, Lynn, Mass., assignor to
Max Zaiger, Swampscott, Mass.

Application February 16, 1955, Serial No. 488,617

8 Claims. (Cl. 15—245)

This invention relates to windshield wiper blades and pertains more particularly to improvements in flexible blades of the general type described in my co-pending application Serial No. 361,697 filed June 15, 1953. Blades of this type consist in general of a rubber wiper strip secured to a flexible metal backer which is engaged by the blade holder.

The object of this invention is to produce a backer for such a blade, which is highly flexible, simple to manufacture, and easy to assemble with the wiper strip, and which holds the wiper strip securely throughout its length. The backer consists in general of two stamped metal strips having edges adapted to engage in suitable side grooves on the wiper strip. Each strip has a sidewardly projecting end tab, and carries two or more hook-shaped members. The two strips are produced as identical stampings and are reversed in position so that, when the wiper strip is in place, the end tabs project across the opposite ends of the backer, and the hook members of each backer strip engage suitably placed holes in the opposite strip, to form an interlocked unit for holding the wiper strip.

In the drawings illustrating the invention:

Fig. 1 is a side view of a blade constructed according to the invention, assembled with the blade holder;

Fig. 2 is an enlarged cross-section taken along line 2—2 of Fig. 1;

Fig. 3 is an enlarged cross-section taken along line 3—3 of Fig. 1;

Fig. 4 is an exploded view of the two strips which make up the backer unit;

Figs. 5 and 6 are opposite end views of one of the backer strips;

Fig. 7 is a plan view of the backer strips assembled together without the wiper strip; and Fig. 8 is a cross-section taken along line 8—8 of Fig. 7.

The blade yoke assembly illustrated in Fig. 1 is of conventional construction and consists of a pair of curved yokes 10 and 11 pivoted at their centers to the ends of a central yoke 12. The latter carries a clip 13 for attaching the blade to a windshield wiper arm. The wiper strip 14, which is ordinarily made of rubber, has a head 15 connected by a narrow neck 16 to a base portion 17. The latter has longitudinal grooves 18 and 19 along its sides.

The backer consists of two flexible strips 20 and 21, which are preferably made of sheet metal. These strips are exactly the same in construction but are reversed in direction when they are assembled with the wiper strip. Strip 20 has an inner margin 22, which engages in one of the side grooves 18 or 19 of the wiper strip, and is provided with an inwardly projecting end tab 23. A plurality of hook-shaped members 24 are bent up from the strip, starting from the bases of notches 26, and are preferably stamped out with the strip, and then formed to an arched shape. The strip 20 also has intermediate openings 28 and notches 30 in its outer edge near its ends. Strip 21 is formed identically as aforesaid. The openings and the hook members are spaced in such a manner that, when the strips are reversed with their inner margins opposed, as in Fig. 4, the hook members 24 of each strip line up with openings 28 of the other strip. The hook members are formed so that they arch upwardly and their free ends extend downwardly below the strip.

When the two backer strips are brought together in their normal assembled relationship, as shown in Figs. 7 and 8, the hook members of each strip engage is the holes of the opposite strip, tab 23 of strip 20 lies across the left-hand end of strip 21, and tab 23 of strip 21 lies across the right-hand end of strip 20. The inner margins 22 of the respective strips are spaced from each other to form an opening 42 of about the width of the thickness of the wiper strip between the grooves.

The wiper strip is preferably applied after the hooks of the assembled backer are thus engaged, the two strips being swung at an angle to permit base 17 to be inserted between them, so that their inner edges fit into the grooves 18, 19. In the completely assembled blade, the inner margins 22 thus engage in the side grooves 18 and 19 of the base 17 of the wiper strip, as shown in Figs. 2 and 3, and tabs 23 serve as stops to prevent longitudinal displacement of the wiper strip. The yokes 10 and 11 have pairs of tabs 43 which are bent around the outer edges of the backer strips and provide a slidable engagement between the yokes and the blade. The outer pair of tabs of yoke 10 are retained in notches 30, and the outer pair of tabs of yoke 11 are similarly retained in notches 30 at the opposite end of the backer. Once the wiper strip is assembled with the backer strips it tends to hold the latter in alignment. In addition, the yokes maintain the backer strips in substantially the same plane, so that, once the blade is assembled on the yokes, the strips cannot swing back far enough to release the wiper strip.

This blade assembly is relatively rigid as to torsion and bending in the sidewise direction, but is flexible in the direction of curvature of the windshield. This flexibility is uniform throughout the length of the blade because the two backer strips are not rigidly connected together at any point. The wiper strip is thus free to bend throughout its length to conform exactly to the curvature of the windshield.

I claim:

1. A windshield wiper blade comprising a flexible wiper strip having a body portion with longitudinal grooves along both sides, and a pair of flexible backer strips having opposed inner margins seated in said grooves, each of said backer strips having hook members fixed at intervals along its length and openings disposed at intervals intermediate the hook members, the hook members of each backer strip straddling said body portion and engaging in the openings of the other backer strip to maintain the backer strips and wiper strip in assembled relationship.

2. A wiper blade as described in claim 1, the body portion having portions underlying said margins, the hook members having free ends projecting through the openings downwardly alongside said underlying portions, said underlying portions engaging said free ends to restrain rotation of either backer strip with respect to the other.

3. A wiper blade as described in claim 1, each of said backer strips having an end tab projecting across an end of the other backer strip to prevent longitudinal displacement of the wiper strip.

4. A windshield wiper blade comprising a flexible wiper strip having a body portion with longitudinal grooves along both sides, and a pair of backer strips of identical construction, each backer strip having sidewardly projecting hook members disposed at intervals along its length, alternating with openings, the backer strips being oppositely disposed with the hook members of one engaged in complemental openings of the other, the margins of the strips between the hook members seating in said grooves, and the hook members straddling part of said body portion.

5. A wiper blade as described in claim 4, each backer strip having an end tab projecting across one end of the wiper strip and restraining the same against longitudinal displacement.

6. A backer, adapted for use with a windshield wiper strip of the type having longitudinal grooves along both sides, comprising an elongated backer strip having a margin adapted to engage in one of said grooves, a number of hook members fixed at spaced intervals to said backer strip and projecting sidewardly therefrom, said backer strip having openings disposed in alternating relationship with said hook members, said hook members being adapted to engage in the complemental openings of a similarly constructed backer strip.

7. A backer strip as described in claim 6, in which the hook members are formed integrally with the backer strip itself.

8. A backer strip as described in claim 6, having a fixed end tab adapted to project across the end of a wiper strip assembled on the backer.

References Cited in the file of this patent
UNITED STATES PATENTS 2,596,063  Anderson _____ May 6, 1952